United States Patent

Behr et al.

[15] 3,686,682

[45] Aug. 22, 1972

[54] METHOD AND APPARATUS FOR TESTING MAGNETIC DISC FILES

[72] Inventors: Michael I. Behr, South Pasadena; Allan E. Carr, Thousand Oaks, both of Calif.

[73] Assignee: Burroughs Corporation, Detroit, Mich.

[22] Filed: Aug. 17, 1970

[21] Appl. No.: 64,281

Related U.S. Application Data

[63] Continuation-in-part of Ser. No. 851,226, Aug. 19, 1969, abandoned.

[52] U.S. Cl. ......................340/174.1 B, 179/100.2 B, 324/34 TA

[51] Int. Cl. .......G01r 33/12, G11b 5/06, G11b 5/46

[58] Field of Search..........340/174.1 B; 179/100.2 B; 324/34 TA

[56] References Cited

UNITED STATES PATENTS

| | | | |
|---|---|---|---|
| 3,474,331 | 10/1969 | Chur | 340/174.1 B |
| 2,937,368 | 5/1960 | Newby | 340/174.1 B |
| 2,793,344 | 5/1957 | Reynolds | 324/34 TA |

OTHER PUBLICATIONS

R. C. Breitenbach et al., IBM Technical Disclosure Bulletin Vol. 12 No. 7, Dec. 1969 page 1004

R. C. Breitenbach et al., IBM Technical Disclosure Bulletin Vol. 12 No. 7, Dec. 1969 pages 1010–1011

*Primary Examiner*—Howard W. Britton

*Attorney*—Christie, Parker & Hale

[57] ABSTRACT

There is described a method and apparatus for testing magnetic disc files by recording pairs of flux transitions at intervals along the length of a decoding track on the magnetic disc, the transitions producing a pair of pulses at periodic intervals during playback. By measuring both the time interval between the peaks of each pair of pulses and measuring the peak amplitude relative to the average amplitude of the recorded pulses, the surface quality of the magnetic discs, as well as the quality and spacing of the magnetic head, is tested.

15 Claims, 2 Drawing Figures

INVENTORS.
MICHAEL I. BEHR
ALLAN E. CARR
BY
Christie, Parker & Hale
ATTORNEYS

METHOD AND APPARATUS FOR TESTING MAGNETIC DISC FILES

RELATED CASES

This application is a continuation-in-part of application Ser. No. 851,226, filed Aug. 19, 1969, and now abandoned.

FIELD OF THE INVENTION

This invention relates to magnetic disc-type recording systems, and more particularly is concerned with method and apparatus for testing the uniformity of recording of digital information by such a system.

DESCRIPTION OF THE PRIOR ART

The use of magnetic drums and magnetic discs as a digital storage medium for digital computers is well known. Drum and disc recorders operate at high surface speeds to achieve high packing densities for the recording of digital data. To reduce wear on both the magnetic surface and the associated transducer heads, recording systems of this type utilize floating heads in which separation between the magnetic head and the surface of the recording medium is maintained. The spacing may be extremely small, for example, of the order of 50 microinches. Such recording systems are extremely sensitive to even the slightest variations in head-to-surface spacing. This means that the disc surface must be machined to extremely close tolerances and the magnetic coating on the surface of the disc or drum, as the case may be, must not have any irregularities or variations in thickness.

One technique for evaluating the quality of the recording system in high-performance magnetic disc files, for example, has been to record input information at high packing densities corresponding to the maximum packing density of the system, for example, 4,000 bits per inch and measuring the peak amplitudes on playback. Then signals at a low packing density are recorded and the peak amplitudes measured on playback. The peak amplitudes of the two signals are then compared. The attenuation ratio of the signal amplitude for a low-density recording versus the signal amplitude for a high-density recording provides a measure of performance. Typically as the maximum packing density is increased, the attenuation ratio increases. The bit rate with which the system is designed to operate is made as high as possible consistent with reliable error-free performance; however, any irregularities in the recording surface thickness or in the magnetic properties of the recording surface adversely affects the attenuation ratio.

While effective schemes have heretofore been proposed for measuring variations in the attenuation ratio, such systems have been cumbersome because amplitude information for two separate signals recorded at two different times must be measured and stored for comparison. This has required use of a digital computer to implement the system, and correlation of data and the determination of the location of the irregularity has been a time-consuming and difficult process where it is desired to make measurements on the entire surface of the disc.

SUMMARY OF THE INVENTION

The present invention is directed to a quality evaluation apparatus and method for high-density recording systems which avoids the necessity of making comparative amplitude measurements of two separate signals recorded at two different times. By the present invention, a single test signal is recorded on any selected channel of the recording system. The recorded signal consists of successive pairs of transitions between two saturation recording levels, with each of the transitions of a pair being spaced at the minimum bit spacing on the magnetic medium. The pairs of transitions are spaced substantially further apart, for example, at a spacing of eight bit intervals. The two transitions produce, respectively, a positive-going and a negative-going pulse on playback. By measuring the time interval between the peaks of the pulses of each pair, a qualitative determination is made of the performance characteristics of the recording system.

Apparatus is provided which successively records the test signal, reads it back into a peak amplitude averaging circuit, and then reads the test signal back again during which time the number of pulse pairs whose spacing exceeds or falls below the normal time spacing by some predetermined amount is counted, and also the number of pulses whose peak amplitudes exceed or fall below the average level by some predetermined amount is counted.

DESCRIPTION OF THE DRAWINGS

For a better understanding of the invention, reference should be made to the accompanying drawings, wherein.

DETAILED DESCRIPTION

Figure 1:
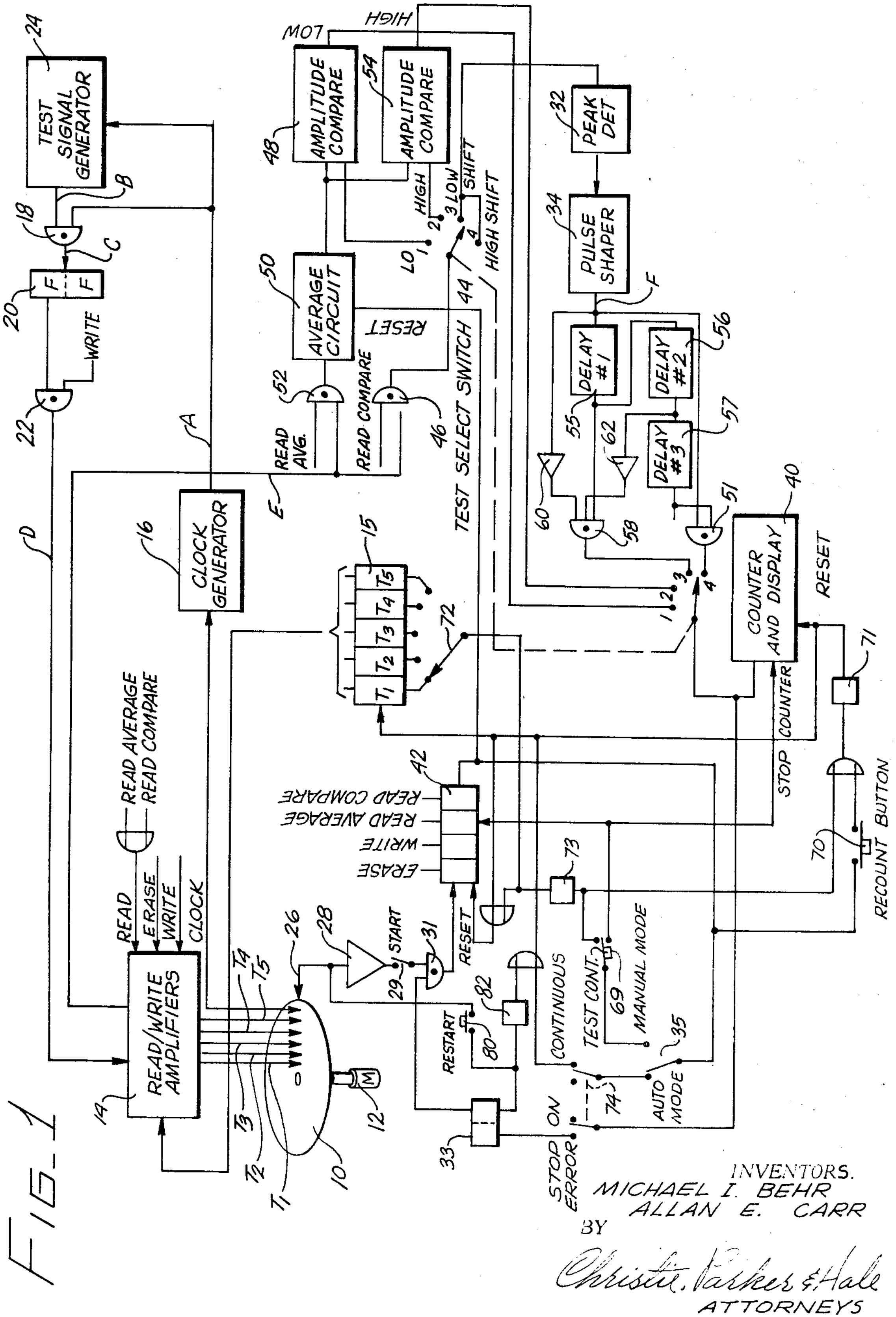
FIG. 1 is a block schematic view of one embodiment of the invention.

Referring to FIG. 1, there is shown schematically a multichannel disc recorder including a disc 10 rotated by a motor 12. The digital information is recorded on the disc on a plurality of concentric tracks, designated $T_1 - T_5$, each tack having associated with it a magnetic gap which is used for recording or playing back information from the track. These gaps may be part of one or more multiple gap magnetic heads which are arranged to float on a cushion of air adjacent the surface of the magnetic disc 10 in a manner well known to the art. The transducer for each individual track is connected to a Read/Write amplifier, as indicated generally at 14. Selection of a particular track is controlled by a counter 15 which can be set to activate any one of the associated Read/Write amplifiers.

A clock generator 16 is controlled from a clock pulse track on the disc, the output of the clock generator providing clock pulses at the frequency at which bits are recorded on the magnetic disc. In a conventional system, the clock source 16 is applied to an AND gate 18, the output of which is applied to the complementing input of a control flip-flop 20. Binary information occurring at the clock rate is also applied to the gate 18, the binary information typically being represented by one voltage level for binary 1's and a lower voltage level for binary 0's. In such a system, clock pulses are passed by the gate 18 whenever a binary 1 is present and clock pulses are inhibited by the gate 18 whenever binary 0's are present on the input. Thus, the flip-flop 20 is complemented in response to binary 1's, but not complemented in response to binary 0's. The level from the output of the flip-flop 20 is applied through an AND gate 22 to the Read/Write amplifiers whenever the system is in a Write mode of operation. By this arrangement, binary 1's are recorded as flux transitions on the magnetic material of the disc, while binary 0's are represented by the absence of such transitions at clock times of the clock generator 16.

Figure 2:
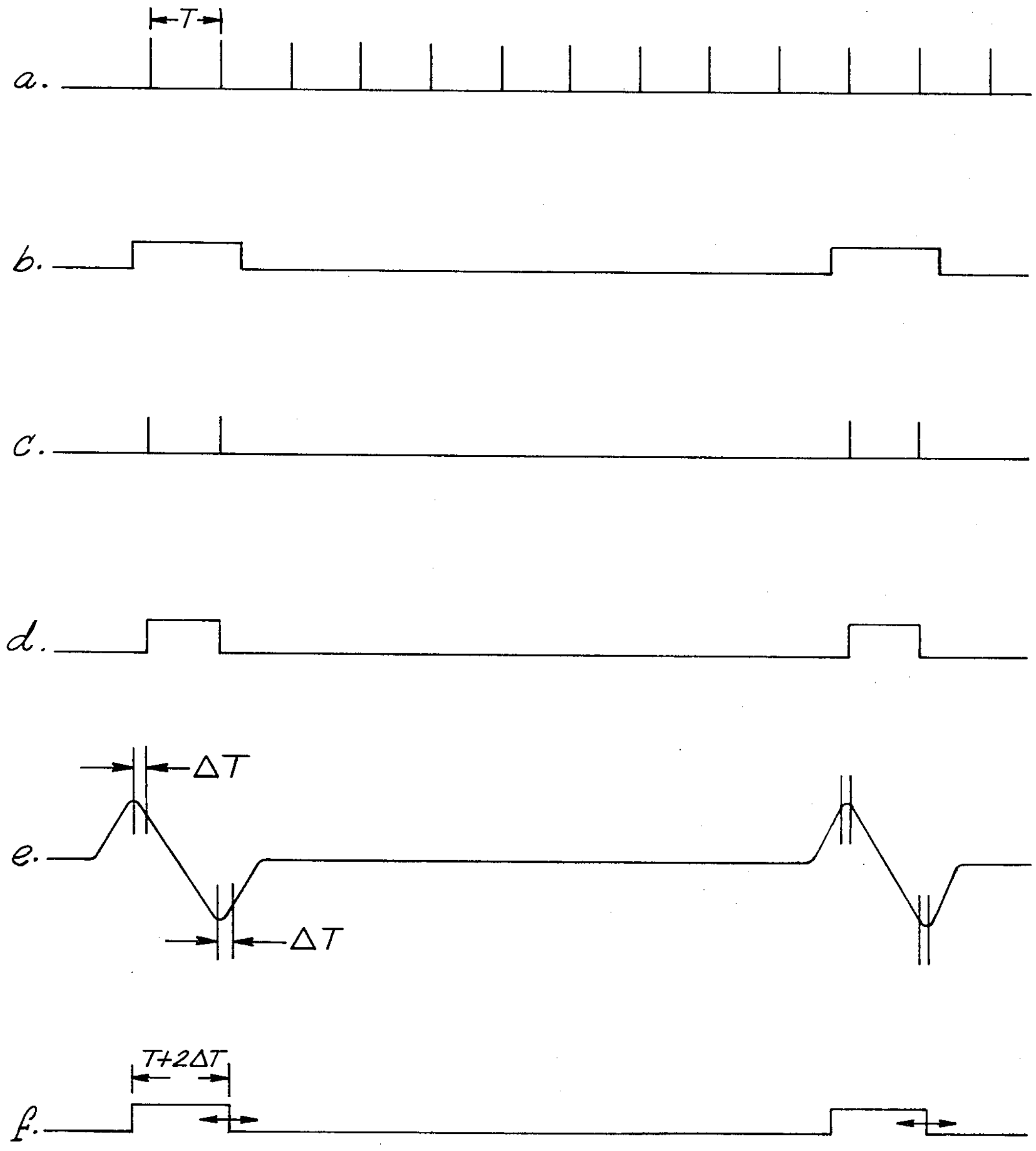
FIG. 2 is a series of wave forms used in explaining the operation of the circuit of FIG. 1.

In the system of the present invention, a test signal generator 24 is used to generate the binary information for recording on the disc. The pattern produced by the generator 24 is arranged to provide two binary 1 signals followed by eight binary 0 signals in a repetitive pattern in synchronism with the clock pulses from the clock generator 16, as shown by the wave form of FIG. 2B. The resulting output of the AND gate 18, as shown by FIG. 2C, is a pair of pulses occurring at successive clock times, followed by an absence of pulses for the next succeeding eight clock pulse times. The signal applied to the recording gap of a particular track is derived from the output of the flip-flop 20 as shown by the wave form in FIG. 2D, wherein the magnetic material is switched between two saturation flux levels in response to each binary 1 of the input.

The test apparatus provides a means of recording the test signal on any selected one or all of the tracks on the disc and then reading back the test pattern and making the appropriate measurements. The control circuitry for the tester includes a control counter 42 which includes at least four states, an Erase state, a Write state, a Read Average state, and a Read Compare state. The control counter 42 is advanced to the various states in response to a tach pulse derived from the disc 10 one each revolution of the disc and sensed by a transducer head 26. The tach pulse is amplified by an amplifier 28 and applied to the counter 42 through a Start switch 29 and an AND gate 31. The AND gate 31 is controlled by a flip-flop 33 which is normally set to permit pulses to be passed by the gate 31. The switch 29 is manually operated to start the test operation by closing the switch. The pulse is generated from the disc 10 from the transducer head 26 once each revolution of the disc.

The control counter 42 is thus advanced through each state during successive revolutions of the disc so that the selected track is first erased and then the test pattern is written on the track. The Write state provides an output signal from the counter 42 which is applied to the AND gate 22 to cause the test signal to be written. Both the Write state and the Erase state are applied to the Read/Write amplifiers to provide the Erase and Write operations on the track selected by the counter 15.

When the control counter 42 cycles through all its states it provides an output pulse to a switch 35 which can be set to either a Manual mode of operation or an Automatic mode of operation. In the Manual mode of operation, the switch passes the pulse back to the control counter 42 to set it to the Read Average state. Thus in the Manual mode the test apparatus goes through the four states on one track and thereafter continues to cycle through the Read Average and Read Compare states until another test is initiated on a different track.

During the Read Compare state of the counter 42, any one of four tests can be made on a selected track and the number of errors produced by any of these tests during one revolution of the disc can be counted. Two of the tests involve determining the number of output pulses during readout where amplitudes exceed or fall below predetermined limits relative to the average amplitude of the pulses recorded on the track. To this end, a test select switch 44 is manually positioned in switch positions 1 or 2 to determine, respectively, the number of too low amplitude pulses and the number of too high amplitude pulses. Assuming the test select switch 44 is in position number 1, the output of an AND circuit 46, to which the readout amplifier of the selected track is applied together with the Read Compare state from the counter 42, is coupled to one input of an amplitude compare circuit 48 which compares the peak amplitude of the pulses with a level derived from the output of an averaging circuit 50. The input to the averaging circuit 50 is derived from an AND circuit 52 to which the output of the read amplifier is coupled together with the Read Average state of the control counter 42. The averaging circuit 50 is conventional in form and includes a circuit for sampling the peak amplitude of each pulse read off the track. The peaks are applied to an integrator circuit which produces an output level proportional to the average peak level of the pulse samples derived from the track. The integrator, whose time constant is exactly equal to the Read Average cycle, produces an output at the end of the Read Average cycle which is equal to the average amplitude of the pulses. The averaging circuit holds this level during the following Read Compare cycle. While only one is shown, two averaging circuits may be used, one for positive pulses and one for negative pulses. The amplitude compare circuit 48 includes a peak detector and a threshold detector circuit which produces an output pulse whenever the amplitude of the input pulse drops below the level provided by the output of the averaging circuit 50 by some predetermined amount. The output of the amplitude compare circuit 48 is applied to a counter 40 through a second section of the test select switch 44 when set in its first position. Thus the number of pulses read off the track which are below the average level by a predetermined amount are counted by the counter 40 and displayed. Normally the threshold for low amplitude errors is set at 0.75 of the average pulse amplitude.

At the end of the Read Compare cycle, the output pulse from the control counter 42 is used to reset the averaging circuit 50. The same pulse which resets the control counter back to the Read Average state also resets the counter 40 so that the error count is continuously recorded. The counter 40 is provided with a readout display, permitting the operator to note the number of errors present during the test.

The same test is provided for determining the number of high amplitude pulses by setting the test select switch 44 to the number 2 position. An amplitude comparison circuit 54 again compares the output of the averaging circuit 50 with the pulses read out of the Read Compare circuit and generates an error pulse whenever the peak amplitude of a pulse exceeds a predetermined reference relative to the average amplitude at the output of the averaging circuit 50. For example, if the voltage at the pulse peak exceeds 1.1 of the average, a high amplitude error pulse is generated which is applied to the counter 40.

With the test select switch 44 set to the third or fourth positions, a test is made on the extent of peak shift occurring in the record-playback process of the disc. As shown by the waveform in FIG. 2E of the output from the playback amplifiers, due to the finite gap width of the playback head as well as other parameters of the recording and playback system which effect the resolution of the output signal, the step transition on the input reproduces during playback as a pulse with a much slower rise time and fall time. The two transitions on successive clock times produce a positive-going pulse followed by a negative-going pulse at the output of the playback amplifier. At higher clock rates, these two pulses overlap, producing an interaction between the two pulses. It has been a practice in the past to measure the change in peak amplitude of a series of pulses at the maximum bit rate versus the amplitude of a single pulse on playback. This ratio is used as a measure of performance quality of the recording system. However, the overlapping or crowding effect of too closely adjacent pulses produces another effect known as "peak shift." Thus, as shown by the wave form of FIG. 2E, the peak of the initial pulse on playback is caused to shift by the crowding effect in a leading direction by an amount $\Delta$ T by the overlapping effect of the next adjacent pulse. By the same token, the next adjacent pulse is shifted in a lagging direction by a similar amount $\Delta$ T, producing an overall peak shift of 2 $\Delta$ T for the pulse doublet. Factors affecting the quality of the recording and playback process, such as variations in the thickness of the magnetic material, variations in spacings of the head from the surface of the magnetic material, changes in the magnetic properties of the surface of the disc all affect the width of the pulses on playback and therefore produce varying degrees of interaction between the pulses with resulting peak shift. Thus, by measuring the peak shift of each doublet, an indication of the performance of the recording and playback system for that particular point on the disc can be determined from the amount of peak shift which occurs in the playback signal of the pulse doublet.

To this end, as shown in FIG. 1, with the Test Select switch 44 set to positions 3 or 4, the output of the Read/Write amplifier 14 is applied to a peak detector circuit 32. The peak detector 32 produces an output pulse at the point of maximum amplitude of each of the input pulses derived from the playback amplifier 30. The output pulses of the peak detector are applied to a pulse shaping circuit 34 which generates a square pulse having a pulse duration which corresponds to the time between successive peaks of each pulse doublet, i.e., a duration of T + 2 $\Delta$ T, as shown by the wave form of FIG. 2F.

If the recording system is working properly and if the head spacing gap width and surface condition of the magnetic material is within standards, the amount of peak shift will fall within predetermined limits. However, if the peak shift is less than predicted, or greater than predicted, a defective condition exists. The degree of peak shift then may be used to produce an error indication.

This is accomplished by applying the output of the pulse shaper 34 to a logical AND circuit 51, the output of which is applied to the position 4 of the test select switch 44 to the input of the counter 40. An error pulse is produced at the output of the AND circuit 51 whenever the trailing edge of the pulse derived from the pulse shaper 34 exceeds a predetermined time interval determined by three series connected delay lines 55, 56 and 57 coupling the output of the pulse shaper 34 to the other input of the logical AND circuit 51. The No. 1 delay circuit 55 has a time delay which corresponds to the time of the write pulse, as shown in FIG. 2D, namely, one clock interval. The No. 2 delay circuit 56 is set to the minimum acceptable peak shift while the No. 3 delay circuit 57 is adjusted so that the sum of the delay times of the circuit 56 and 57 equals the maximum acceptable peak shift. Thus, if the trailing edge of the pulse from the pulse shaper 34 extends beyond the start of the delayed pulse at the output of the No. 3 delay circuit 57, the output of the AND circuit 51 will momentarily go true causing a pulse to be applied to the counter 50 through position 4 of the switch 44. Thus the counter 40 counts the number of pulse pairs recorded on the track which exceed the maximum allowable peak shift during playback of the test signal.

With the test select switch 44 in the number 3 position, the output of the logical AND circuit 58 is applied to the counter 40. The logical AND circuit 58 has three inputs, one of which is coupled to the output of the pulse shaper 34 through an inverter 60, the other of which is coupled to the output of the pulse shaper through the No. 1 delay circuit 55, and the third input of which is coupled to the output of the second delay circuit 56 through an inverter 62. The output of the AND circuit 58 is true if the leading edge of the pulse at the output of the second delay circuit 56 occurs before the termination of the pulse at the output of the No. 1 delay circuit 55 but after the termination of the pulse shaper 34. Thus the output of the AND circuit 58 momentarily goes true whenever the peak shift falls below the minimum allowed. The counter 40 with the switch in position number 3 counts the number of such events which produce an output at the AND circuit 58.

With the switch 35 set for the Manual mode, the pulse which recycles the counter 42 back to the Read Average state is also applied to the counter display 40 to stop the counter. Thus the counter continues to display the number of errors produced by the test during one revolution of the disc during the Read Compare state of the counter 42. With the counter 42 continuing to recycle through the Read Average state and the Read Compare state, a new count condition can be produced by pushing a recount button 70 which passes the pulse generated at the output of the control counter 42 as it cycles through the Read Compare state to a one-shot trigger circuit 71 which generates a single pulse for resetting the counter 40.

In order to continue the test on another track, a manual switch 72 is set to the selected stage of the track-selecting counter 15. A test Continue button 69, when pressed, directs pulses from the output of the counter 42 to a one-shot trigger circuit 73, the output of which is applied through the selector switch 72 to set the counter 15 to the desired track state. The same pulse is also applied to reset the control counter 42 back to the erase condition whereby the test operation is completed on another selected track of the disc 10.

The switch 35 may also be set to an Automatic test mode rather than the Manual test mode. In this state, the pulse output from the control counter 42, at the completion of each Read Compare operation, is connected by a double-pole, double-throw switch 74 to advance the track-selecting counter 15 and to reset the control counter 42. This occurs when the switch 74 is set to the continuous operation position. In this position the pulse generated by the control counter 42 advances the track-selecting counter 15 and resets the control counter 42 and also resets the counter 40, thus the test can be run continuously on successive tracks in the continuous mode.

Alternatively the switch 74 may be set to a stop-on-error mode in which an error pulse at the same time is applied to the counter 40 and is also applied by the switch 74 to the control flip-flop 33 turning it off. This prevents any pulses from the disc being applied to the control counter 42. A restart button 80 can be pressed by the operator to turn the control flip-flop 33 back on. The restart button 80 also actuates a one-pulse trigger 82, the output of which is applied to the control counter 42 to reset it, and is applied to the track-selecting counter 15 to advance it to the next track. Thus the restart button 80 provides a means of continuing the test whenever it is interrupted by an error condition.

From the above description it will be recognized that a novel testing apparatus and method is provided which provides an analytical tool for determining the performance capabilities of a magnetic disc file. The peak-shift test, if it indicates too large a peak shift, indicates a defect in the surface condition of the disc. If a number of sequential errors take place and the amplitude test indicates that the amplitude is reduced, the too wide a peak shift indicates that the magnetic head is too high off the disc. On the other hand, if the amplitude test indicates that the amplitude is not affected, this wold suggest that the magnetic head gap is too wide. If the peak shift test indicates too small a peak shift and if the amplitude test also reads low, the head gap probably is too short. If the amplitude test is not low, this indicates that the head is too close to the disc and that a dangerous mechanical condition exists. Thus the present invention permits rapid testing of not only the surface condition of the disc, but the characteristics of the magnetic recording heads as well as the spacing of the heads from the disc surface.

What is claimed is:

1. The method of evaluating the recording performance of a digital magnetic recording system in which digital information is recorded on a moving magnetic medium as transitions between two magnetic flux saturation states at predetermined minimum bit intervals, the method comprising the steps of recording a pair of said flux transitions on the magnetic medium with the time interval between the flux transitions in each pair corresponding to the minimum bit interval of the digital recording system and the interval between adjacent pairs of transitions being substantially greater than said minimum bit interval, generating an electrical signal from the flux transitions on the recording medium, each flux transition generating an output pulse, measuring the time interval between the peaks of the adjacent output pulses generated from a pair of said flux transitions, and comparing said measured time interval with a predetermined time interval to detect any variation of the measured time interval relative to the predetermined time interval.

2. The method of claim 1 including the further step of measuring all the peak pairs and determining the number of measured pulse peak intervals which exceed a desired time interval.

3. The method of claim 1 including the further step of measuring all the peak pairs and determining the number of measured pulse peak intervals which are less than a desired time interval.

4. The method of testing the recording performance of a digital magnetic recording system in which the recording medium moves at a constant rate comprising the steps of forming at spaced intervals along a recording track a pair of flux transitions between two opposite polarities of flux saturation, the spaced intervals being substantially greater than the distance between the pair of transitions, generating electrical pulses from the flux transitions on the recording medium as it moves at said constant rate, and comparing the time interval between the amplitude peaks of the pair of pulses generated from each pair of flux transitions with a predetermined time standard to indicate an abnormal difference in the time interval of the peaks relative to said time standard.

5. The method of claim 4 further comprising the steps of generating a reference signal proportional to the average peak amplitude of all the pulses of one polarity generated from said flux transitions, and comparing the peak amplitude of each pulse of said one polarity with said reference signal to indicate any abnormal difference in the amplitude relative to the average.

6. The method of claim 4 further including the steps of counting the number of pulse pairs having an abnormal peak spacing.

7. The method of claim 6 further including the steps of separately counting the number of pulse pairs exceeding a predetermined time standard and counting the number of pulse pairs falling below a predetermined time standard.

8. Apparatus for testing the performance characteristics of a magnetic recording system having one or more tracks on a recording medium on which binary information can be recorded and played back, comprising signal generating means for periodically generating rectangular pulses of predetermined duration corresponding to the minimum binary bit recording interval of the recording system, means coupled to the output of the said generating means for recording the pulses on any selected track on the disc in the form of a change in flux polarity at the leading and trailing edges of each pulse, playback means responsive to the changes in flux level on the track for generating a pulse in response to each flux change, means responsive to the pulses from said playback means for generating a timing signal indicating the time interval between the amplitude peaks of each pair of pulses generated by the playback means, and means responsive to said timing signal providing an indication whenever said time duration is not within predetermined limits.

9. Apparatus as defined in claim 8 including means responsive to said indicating means for counting each time said time duration is not within said predetermined limits.

10. Apparatus as defined in claim 9 wherein said counting means includes means for separately counting each time said time duration exceeds a predetermined time interval.

11. Apparatus as defined in claim 9 wherein said counting means includes means for separately counting each time said time duration falls below a predetermined time interval.

12. Apparatus as defined in claim 9 further including means responsive to the pulses from said playback means for generating a signal proportional to the average peak amplitude of the pulses derived from one track, and comparing means responsive to the peak amplitude of the pulses from said playback means for indicating when the peak amplitude of any of said pulses differs from the average peak amplitude by a predetermined amount.

13. Apparatus as defined in claim 12 further including means responsive to said comparing means for counting each time a pulse exceeds said predetermined amount.

14. Testing apparatus for testing the performance characteristics of each of the digital recording tracks of multiple track magnetic disc file in which each track has associated therewith transducer means for recording and reproducing binary signals on the disc, said apparatus including signal generating means synchronized with rotation of the disc for generating a test signal, the test signal having a wave form which produces a pair of closely spaced flux transitions at spaced intervals along a selected track on the disc when applied to the transducer means, means for coupling the output of the signal generating means to each of the transducer means in succession, means coupled to each of the transducing means in succession for generating an output signal in response to the test signal recorded thereon, the output signal comprising a pair of pulses for each pair of flux transitions passing a transducing head, means sensing the time duration between peaks of each of said pair of pulses, and error indicating means indicating when said time duration between pairs of pulse peaks is outside predetermined limits.

15. Apparatus as defined in claim 14 further including means responsive to said error indicating means for interrupting the successive coupling of said output signal generating means, whereby the output signal generating means remains coupled to the transducer means associated with a track producing an error.

* * * * *